United States Patent
Nelson et al.

(10) Patent No.: US 9,444,934 B2
(45) Date of Patent: Sep. 13, 2016

(54) SPEECH TO TEXT TRAINING METHOD AND SYSTEM

(71) Applicant: Nedelco, Inc., Aurora, NE (US)

(72) Inventors: Phillip C. Nelson, Oakley, UT (US); John Nelson, Aurora, NE (US); Gerald D. Warren, Aurora, NE (US)

(73) Assignee: Nedelco, Inc., Aurora, NE (US)

(*) Notice: Subject to any disclaimer, the term of this patent is extended or adjusted under 35 U.S.C. 154(b) by 0 days.

(21) Appl. No.: 14/505,111

(22) Filed: Oct. 2, 2014

(65) Prior Publication Data

US 2016/0098995 A1    Apr. 7, 2016

(51) Int. Cl.
| | |
|---|---|
| *H04M 3/493* | (2006.01) |
| *G09B 21/00* | (2006.01) |
| *G10L 15/26* | (2006.01) |
| *H04M 3/42* | (2006.01) |
| *G10L 15/22* | (2006.01) |
| *G10L 17/00* | (2013.01) |

(52) U.S. Cl.
CPC .......... *H04M 3/4936* (2013.01); *G09B 21/009* (2013.01); *G10L 15/26* (2013.01); *H04M 3/42391* (2013.01); *G10L 17/00* (2013.01); *G10L 2015/227* (2013.01)

(58) Field of Classification Search
CPC ............................ G10L 15/265; H04M 3/4936
USPC ................... 704/7, 235, 245, 246, 251, 271
See application file for complete search history.

(56) References Cited

U.S. PATENT DOCUMENTS

| | | | | |
|---|---|---|---|---|
| 2004/0145652 | A1* | 7/2004 | Yamauchi | H04N 7/15 348/14.02 |
| 2007/0244702 | A1* | 10/2007 | Kahn | G10L 15/22 704/260 |
| 2008/0082332 | A1* | 4/2008 | Mallett | G10L 15/07 704/250 |
| 2009/0012878 | A1* | 1/2009 | Tedesco | G06Q 30/06 705/26.41 |
| 2013/0102288 | A1* | 4/2013 | Hussain | G10L 15/26 455/414.1 |

* cited by examiner

*Primary Examiner* — Marcellus Augustin
(74) *Attorney, Agent, or Firm* — Foley & Lardner LLP (57) ABSTRACT

An illustrative method includes receiving, at a processor of a computing device, an audio voice signal of a first call participant during a first call, where the first call is a communication across a communication network. The method further includes determining an identity of the first call participant and determining a speech to text profile associated with the identity of the first call participant, where the speech to text profile includes at least one rule for transcribing a word in the audio voice signal into text. The method further includes generating a text output, where the text output is a transcribed version of a plurality of words identified in the audio voice signal of the first call participant. At least one of the plurality of words identified is identified using the at least one rule.

17 Claims, 7 Drawing Sheets

SPEECH TO TEXT TRAINING METHOD AND SYSTEM

BACKGROUND

Various technologies have been developed to enable hard of hearing individuals communicate using telephone communication systems. For example, text telephones, such as Telecommunication Devices for the Deaf (TDD), enable deaf, hard of hearing, speech-impaired individuals to communicate over the telephone with hearing and speaking parties using conventional telephones. In TDD systems, the hard of hearing person typically uses a specially equipped device with a keyboard to type messages and a text display for presenting responses to the caller.

Telecommunication relay services or dual party relay services enable deaf, hard of hearing, speech-impaired individuals to employ text telephones for engaging in a communication session over a telephone network with a person who has a conventional voice telephone. Relay services involve a hard of hearing individual using a keyboard to communicate and a display device to understand what is being said by the other party. The hearing person hears what is being said and uses his voice to communicate. A relay communication assistant (CA) acts as the interface in this situation. The CA relays information from one communication protocol to another. For example, the CA types what the hearing person says and sends the text to the hard of hearing person. The CA can also read aloud text messages from the hard of hearing person so that the hearing person can hear the message.

Other call centers may also employ various telephonic technologies. For example, a customer service center may have an automatic answering service when customers call a customer service number. The automatic answering service may pose questions to the caller. The caller may respond, for example, by inputting numbers on their telephone, which indicates an answer to a question posed to the caller. The automatic answer service may use the responses of the caller to help address the caller's concern or properly route the caller to an operator that can properly address the caller's concern.

SUMMARY

An illustrative method includes receiving, at a processor of a computing device, an audio voice signal of a first call participant during a first call, where the first call is a communication across a communication network. The method further includes determining an identity of the first call participant and determining a speech to text profile associated with the identity of the first call participant, where the speech to text profile includes at least one rule for transcribing a word in the audio voice signal into text. The method further includes generating a text output, where the text output is a transcribed version of a plurality of words identified in the audio voice signal of the first call participant. At least one of the plurality of words identified is identified using the at least one rule.

An illustrative system includes a memory and a processor coupled to the memory. The processor is configured to receive an audio voice signal of a first call participant during a first call, where the first call is a communication across a communication network. The processor is further configured to determine an identity of the first call participant, and to determine a speech to text profile stored in the memory that is associated with the identity of the first call participant, where the speech to text profile comprises at least one rule for transcribing a word in the audio voice signal into text. The processor is further configured to generate a text output, where the text output is a transcribed version of a plurality of words identified in the audio voice signal of the first call participant. The at least one of the plurality of words identified is identified using the at least one rule.

An illustrative non-transitory computer readable medium having instructions stored thereon for execution by a processor, the instructions include instructions to receive, by the processor, an audio voice signal of a first call participant during a first call, wherein the first call is a communication across a communication network. The instructions further include instructions to determine, by the processor, an identity of the first call participant. The instructions further include instructions to determine, by the processor, a speech to text profile associated with the identity of the first call participant, where the speech to text profile includes at least one rule for transcribing a word in the audio voice signal into text. The instructions further include instructions to generate, by the processor, a text output, where the text output is a transcribed version of a plurality of words identified in the audio voice signal of the first call participant. The at least one of the plurality of words identified is identified using the at least one rule.

BRIEF DESCRIPTION OF THE DRAWINGS

Illustrative embodiments will hereafter be described with reference to the accompanying drawings.

DETAILED DESCRIPTION

Described herein are illustrative embodiments for methods and systems that provide for a speech to text profile to be created and used in a telephone relay setting. Speech to text software may be trained to recognize the speech of a particular user. In traditional telephone relay settings, any speech to text mechanism may be used to turn a communication assistant's (CA), or operator's, speech into text. In such a setting, the speech to text mechanism may only need to recognize the voice of a CA. However, in such an embodiment, the CA may be present for an entire call. If the speech of a participant of a call (either a caller or a callee) can be recognized, CA's may not be necessary for the call participants to complete a call using the telephone relay services according to an illustrative embodiment. A speech to text profile for a participant of a call using telephone relay services may be created, trained, and used in a telephone relay so that speech may be turned in to text automatically without the assistance of a CA. The current disclosure is directed to a method, system, and computer-readable medium for a speech to text profile training and utilization for telephone relay services.

In an illustrative embodiment, a caller may place a call. A participant in the call may be hard of hearing. The hard of hearing participant may place the call or receive the call. In a typical telephone relay call, the hard of hearing participant is equipped with a special telephone that can display data or text. When the hearing participant speaks through their normal telephone, the words the hearing participant speaks are transcribed into text that is sent to the special telephone of hearing participant. In an illustrative embodiment, the audio voice signal of the hearing participant is also sent to the special telephone. Thus, the hard of hearing participant receives at their special telephone both a text signal that is output on a display and the audio voice signal from the hearing participant. If the hard of hearing participant is able to speak, the hard of hearing participant is able to talk to the hearing participant normally, and the audio voice signal from the hard of hearing participant is transmitted directly to the hearing participant.

As defined throughout the present application, a special telephone may be a variety of devices, software, and implementations of a relay service. For example, a special telephone as disclosed herein may be a mobile phone, a captioned telephone, a personal computer, a tablet, or any other sort of telephonic device. For example, a smart mobile phone may have stored upon it a web browser or a specific software application. The web browser may be directed to a web page that facilitates calling and any of the features or methods disclosed herein. The specific software application on a mobile phone may also facilitate any of the features or methods disclosed herein. A personal computer, such as a desktop or laptop computer, may also have stored upon on it a web browser or specific software application that facilitates any of the features or methods disclosed herein. In some embodiments, the specific software application may be a browser based specific application, such as a web-based captioning software (e.g., WebCapTel™). In other embodiments, a captioned telephone, such as a CapTel™ phone, may be used. A captioned telephone may utilize a public switched telephone network (PSTN) or operate through an internet protocol (IP) connection. Other devices than the devices listed here may also be used in combination with systems and methods disclosed herein. Further, some embodiments as disclosed herein may not utilize a special telephone at all. For example, a standard telephone or standard mobile telephone may also be used in some embodiments of the systems and methods disclosed herein. For example, where a caller is not hard of hearing and calls a customer service system, that customer service system may establish or utilize a speech to text profile. In such an embodiment, the telephone used by the customer may not need to be specially equipped with any additional hardware or software than a standard telephone.

Often, the transcribed text of the hearing participant's audio voice signal is generated at least in part due to a communication assistant (CA). The CA can help generate the transcribed text in different ways. In one illustrative embodiment, the CA hears the audio voice signal from the hearing participant, and types the words heard into a keyboard, which results in the transcribed text being output to the special phone of the hard of hearing participant. In another illustrative embodiment, the CA hears the audio voice signal and re-speaks the words heard into a speech to text device. The speech to text device can be trained for the CA, and/or the CA can be trained to speak with the proper diction, frequency, pace, etc. to ensure accuracy in transcribing the speech to text. Advantageously, the present disclosure demonstrates a method, system, and computer readable medium for training a speech to text device to accommodate various call participant's audio voice signal using speech to text profiles for individual call participants. Advantageously, using speech to text profiles eliminates or greatly reduces the need for a CA to mediate calls and reproduce or transcribe text for a hard of hearing participant. Advantageously, reducing the need for a CA also increases privacy for the participants in the call.

A speech to text profile may be trained for a call participant. First, when a call is initiated, a unique identifier may be used to determine a call participant identity. For example, the unique identifier may be the phone number of a hearing participant. The unique identifier can be associated with a speech to text profile created for the hearing participant. Thus, whenever the hearing participant is involved in subsequent calls, the speech to text profile for that hearing participant can be either further trained or used transcribe the hearing participant's audio voice signal into text.

In an illustrative embodiment, a speech to text profile may be trained before a call participant's speech is transcribed to text. This training may occur in order to increase the accuracy and efficacy of the transcribing. In another embodiment, speech to text transcribing may occur immediately for a call participant, but the speech to text profile may be updated as transcribing occurs to train it to not make errors in the future. A speech to text training may occur through the assistance of a CA. The CA may input, through an audio voice signal or through a keyboard, the words being spoken by the call participant. The relay call computer of the CA may separately transcribe the audio voice signal from the call participant into text. The relay call computer of the CA may then compare the transcribed audio voice signal of the call participant to the text input from the CA. When the CA inputs through an audio voice signal, the relay call computer may also transcribe the CA audio voice signal into text, which is compared to the text transcribed from the audio voice signal from the call participant. Upon comparing the input text from the CA and the transcribed text from the call participant audio voice signal, the relay call computer can note differences between the transcribed text and the input text. Where the two differ, the input text is preferred, and the relay call computer will store a rule associated with the speech to text profile that whenever that particular audio voice signal is heard again for that call participant, the transcribed text should be the input text rather than what was originally transcribed by the speech to text system. In this embodiment, the output to the special phone of the hard of hearing participant is the input from the CA until the speech to text profile is fully trained. After the speech to text profile is fully trained, the speech to text system output can be transmitted to the special phone of the hard of hearing participant and the involvement of a CA is no longer required.

In another illustrative embodiment, the speech to text profile may be trained through monitoring by the CA of the speech to text transcribing of the speech to text system. For example, after a speech to text profile is created, the speech to text system will automatically begin transcribing the audio voice signal of a call participant. The CA can review the output text of the speech to text system before it is sent to the hard of hearing participant's special phone. If the CA notes errors in the output, the errors can be corrected in the text sent to the hard of hearing participant's special phone. Whenever the CA makes a correction, that correction can be stored as a rule in the call participant's speech to text profile, so that same correction may be made in subsequent speech to text processing. After the speech to text profile is fully trained, the speech to text system output can be transmitted to the special phone of the hard of hearing participant without the involvement of a CA.

The speech to text profile may be considered fully trained based on various metrics. In an illustrative embodiment, a speech to text profile is fully trained when it has been trained for a minimum threshold of cumulative call time. That is, a particular speech to text profile may be trained over the course of one or more phone calls, and the speech to text profile will be considered trained after the cumulative phone call time of the one or more phone calls reaches a threshold time. Examples of a minimum threshold of cumulative phone call time for training may be 10, 20, 30, 60, 90, or 120 minutes to obtain a level of accuracy suitable for a commercial telephone relay service. Advantageously, training a speech to text profile incidentally during the normal course of calls eliminates the call participant having to voluntarily take the time to separately train a speech to text profile outside of the context of a phone call the participant would have made anyway. That is, the training may take place automatically and may even take place without the knowledge of the participant.

Figure 1:
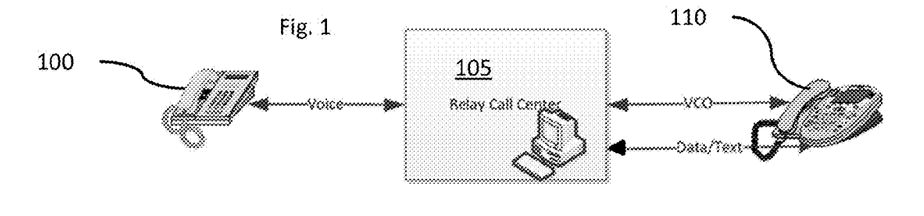
FIG. 1 is a process flow diagram demonstrating a telephone relay system in accordance with an illustrative embodiment.

FIG. 1 is a process flow diagram demonstrating a telephone relay system in accordance with an illustrative embodiment. In alternative embodiments, fewer, additional, and/or different components may be included in the system. FIG. 1 shows a telephone 100, a relay call center 105, and a special telephone 110. As noted above, the special telephone 110 may include a number of different embodiments. In other words, several different physical implementations of a special telephone may be utilized as the special telephone 110. The telephone 100 is a standard telephone that can be used by a hearing participant in a call. The telephone 100 and the special telephone are both connected to the relay call center 105. This connection is through a public switched telephone network (PSTN). Such a network may be effected through land communication lines, fiber optic cables, telephone networks, satellite communications, the internet, cellular networks, radio or wireless internet frequencies, and the like, or any combination thereof. The relay call center 105 serves as an intermediary for relaying communications between the telephone 100 and the special telephone 110. The telephone 100 can send and receive voice signals to the relay call center 105. In alternative embodiments, the telephone 100 may be a special telephone similar to the special telephone 110 with added functionalities such as receiving and displaying text from the relay call center 105.

The relay call center 105 includes a computing device that receives an audio voice signal from the telephone 100 and an audio voice signal from the special telephone 110, and receives input from a communication assistant (CA) that is output to the special telephone 110 and is text representing the audio voice signal received from the telephone 100. The relay call center 105 transmits the audio voice signal from the telephone 100 to a speaker on the special telephone 110. The relay call center 105 also transmits the audio voice signal from the special telephone 110 to the telephone 100. Thus, a hard of hearing participant using the special telephone 110 can still attempt to hear a participant speaking using telephone 100. Further, the hard of hearing participant can speak normally through the special telephone 110 and the participant using the telephone 100 will be able to hear the audio voice signal through a speaker on the telephone 100. The speaking of a hard of hearing participant is sent to the relay call center 105 as voice carry over (VCO). The VCO in FIG. 1 also includes the speaking of the user of the telephone 100. In an alternative embodiment, if the hard of hearing participant is unable to speak, the special telephone 110 is equipped with a text entry function, which allows the non-speaking participant to communicate text to the relay call center 105. A CA at the relay call center 105 can then read the text sent from the special telephone 110 and read aloud the text, and the read aloud audio signal is transmitted to the speaker of the telephone 100. In such an embodiment, the system may function as a text to speech application. In other words, text from the non-speaking party may be turned into speech for the speaking party. In such an embodiment, a profile may still be set up for the non-speaking party as disclosed herein, except that rules would be set up based on the text inputs of the non-speaking party. That is, the system could learn from common typos or shorthand used by the non-speaking party when inputting text in order to make the text to speech generation more accurate as time goes on (as the text to speech profile gets trained).

Figure 2:
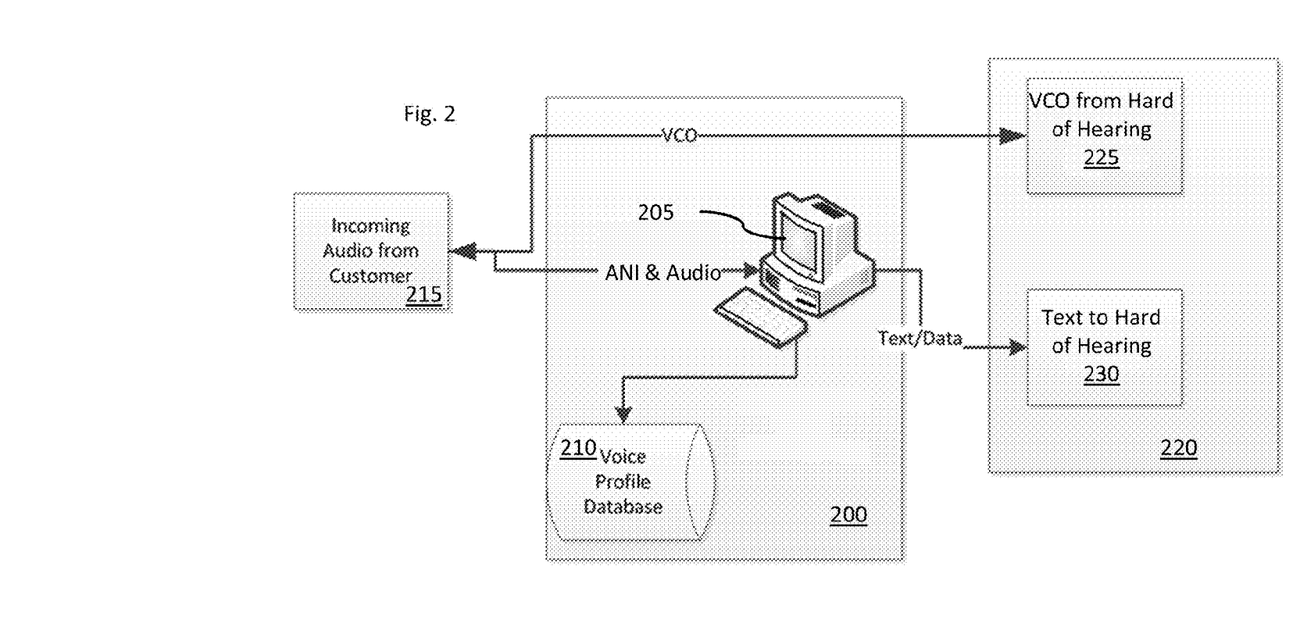
FIG. 2 is a process flow diagram demonstrating a telephone relay system that utilizes a speech to text voice profile database in accordance with an illustrative embodiment.

FIG. 2 is a process flow diagram demonstrating a telephone relay system that utilizes a speech to text voice profile database in accordance with an illustrative embodiment. In alternative embodiments, fewer, additional, and/or different components may be included in the system. FIG. 2 shows a relay call center 200, a telephone 215, and a special telephone 220. Similar to FIG. 1, the telephone 215 and the special telephone 220 can receive and send voice carry over (VCO) at 225, which is routed through the relay call center 200. In this embodiment, the hard of hearing call participant using the special telephone 220 can speak to the participant using telephone 215. A computing device 205 at the relay call center 200 receives audio from the call participant using the telephone 215. The computing device 205 at the relay call center 200 also receives automatic number identification (AIN), which indicates the phone number of the telephone 215. The computing device 205 can establish a speech to text profile in the voice profile database 210 using the phone number to uniquely identify the profile. Alternatively, the computing device 205 could determine that a speech to text profile already exists for the particular phone number of the telephone 215. If the speech to text profile already exists, the computing device could continue to train (update the speech to text profile with additional rules) the speech to text profile. In another embodiment, the computing device may use the speech to text profile to automatically transcribe an audio voice signal from the telephone 215 into text to be sent to the special telephone 220 at 230. In another embodiment, the computing device 205 may determine whether to (1) continue to train the speech to text profile while using the speech to text profile to transcribe an audio voice signal, (2) train the speech to text profile without using the speech to text profile to transcribe an audio voice signal, or (3) use the speech to text profile to transcribe an audio voice signal without further training the speech to text profile.

Figure 3:
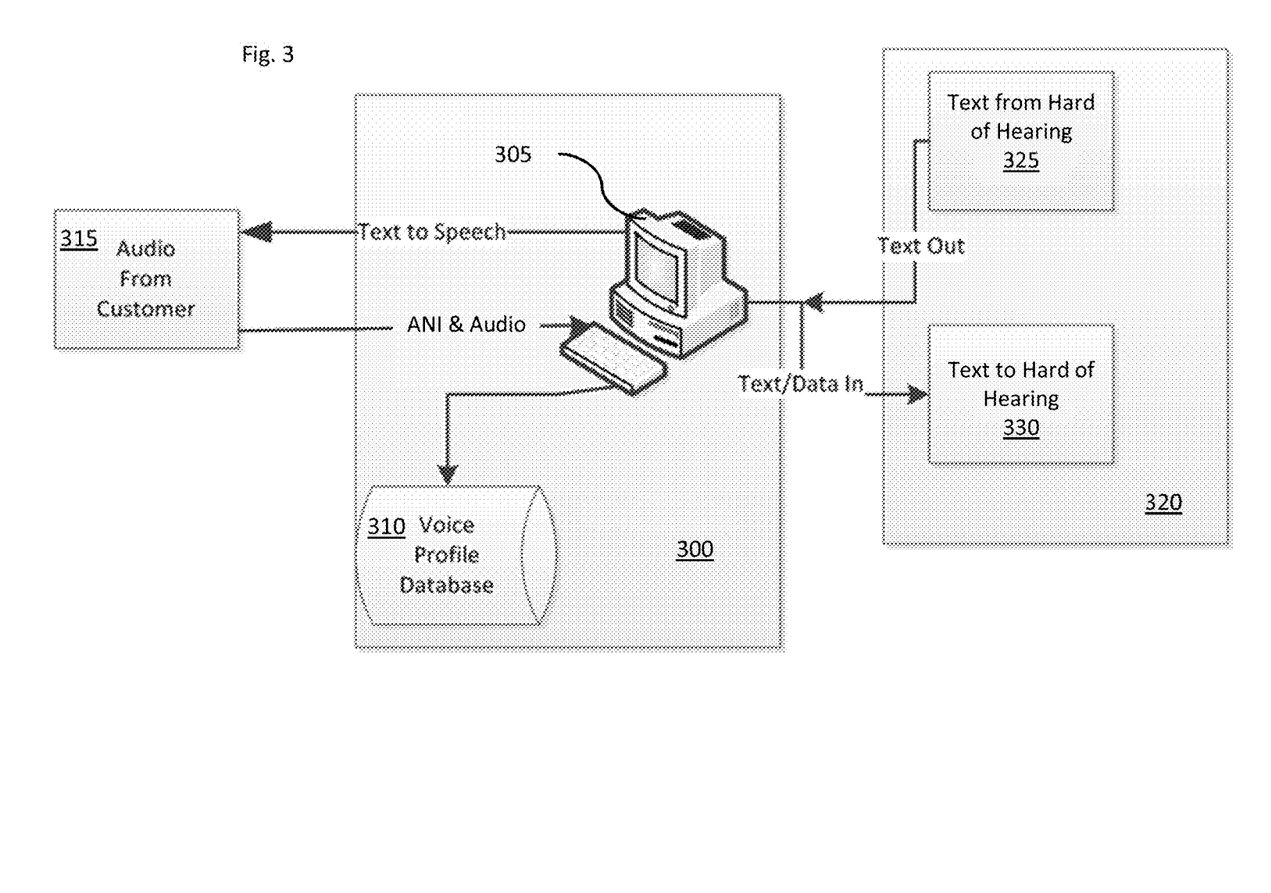
FIG. 3 is a process flow diagram demonstrating another example of a telephone relay system that utilizes a speech to text voice profile database in accordance with an illustrative embodiment.

FIG. 3 is a process flow diagram demonstrating another example of a telephone relay system that utilizes a speech to text voice profile database in accordance with an illustrative embodiment. In alternative embodiments, fewer, additional, and/or different components may be included in the system. FIG. 3 includes a relay call center 300, a telephone 315, and a special telephone 320. The relay call center 300 includes a computing device 305 and a voice profile database 310. Like the relay call center 200, voice profile database 210, and the computing device 205 in FIG. 2, the relay call center 300 in FIG. 3 may store, use, train, etc. speech to text voice profiles.

Unlike FIG. 2, the special telephone 320 does not input or output voice carry over (VCO). Instead, the special telephone 320 receives and sends text data. A voice audio signal from the telephone 315 is transcribed into text data at the computing device 305 and send to the special telephone 320 at 330. When the participant at the special telephone 320 wishes to communicate to the participant at telephone 315, text is input to the special telephone 320 at 325. At the computing device 305, the text from the special telephone 320 is converted to speech and sent to the telephone 315. The converted speech sent to the telephone 315 is machine generated by the computing device 305. In an alternative embodiment, the speech generated by a communication assistant (CA) that reads the text sent from the special telephone 320 at the computing device 305. As in FIG. 2, the audio voice signal from the participant at the telephone 315 can be transcribed to text at the computing device 305 in multiple ways, including using a speech to text profile stored in the voice profile database 310 to accurately transcribe the audio voice signal from the telephone 315.

Figure 4:
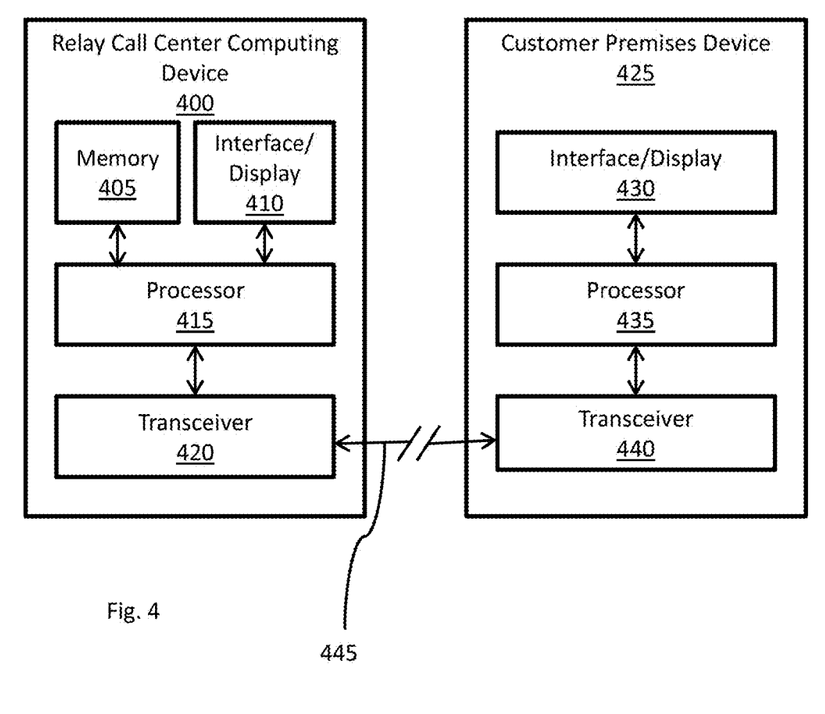
FIG. 4 is a block diagram illustrating computing devices that may be used in a telephone relay system in accordance with an illustrative embodiment.

FIG. 4 is a block diagram illustrating computing devices that may be used in a telephone relay system in accordance with an illustrative embodiment. In alternative embodiments, fewer, additional, and/or different components may be included in the system. In FIG. 4, there is a relay call center computing device 400 and a customer premises device 425. The relay call center computing device 400 includes a processor 415 that is coupled to a memory 405. The processor 415 can store and recall data and applications in the memory 405. The processor 415 can execute sets of instructions stored on the memory. In one example, a set of instructions may be an application that stores and uses various speech to text profiles to automatically transcribe an audio voice signal. The memory 405 may store more than one application. The processor 415 may also display objects, applications, data, text, inputs from a keyboard or microphone, etc. on an interface/display 410. The processor 415 is also coupled to a transceiver 420. With this configuration, the processor 415, and subsequently the relay call center computing device 400, can communicate with other devices, such as the customer premises device 425 through a connection 445.

In an alternative embodiment, all or part of the memory 405 may exist outside the relay call center computing device 400 as a separate database. The database may be accessed by the relay call center computing device 400 similar to the way memory 405 is accessed or similar to the way connection 445 operates as between two transceivers.

The customer premises device 425 includes a processor 435 that is coupled to an interface/display 430. The processor 435 is also coupled to a transceiver 440. With this configuration, the processor 435, and subsequently the customer premises device 425, can communicate with other devices, such as the relay call center computing device 400 through the connection 445.

The customer premises device 425 may be a special telephone such as one of the special telephones discussed with respect to FIG. 1, 2, or 3 above. In an alternative embodiment, the customer premises device 425 may be a smart phone, desktop computer, laptop computer, tablet, personal data assistant, or other electronic device.

The devices shown in the illustrative embodiment may be utilized in various ways. For example, the connections 445 may be varied. The connection 445 may be a hard wired connection. A hard wired connection may involve connecting the devices through a USB (universal serial bus) port, serial port, parallel port, or other type of wired connection that can facilitate the transfer of data and information between a processor of a device and a second processor of a second device, such as between the relay call center computing device 400 and the customer premises device 425. In another embodiment, the connection 445 may be a dock where one device may plug into another device. While plugged into a dock, one device may also have its batteries charged or otherwise be serviced. In other embodiments, the connection 445 may be a wireless connection. Such a connection may take the form of any sort of wireless connection, including but not limited to Bluetooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, the connection 445 may represent several different computing devices and network components that allow the various devices to communicate through the internet, either through a hardwired or wireless connection. The connection 445 may also be a combination of several modes of connection.

To operate different embodiments of the system or programs disclosed herein, the various devices may communicate in different ways. For example, the relay call center computing device 400 may download or have installed upon it various software applications, such as an application for creating, using, and administrating speech to text voice profiles. Such software applications may allow the various devices in FIG. 4 to perform some or all of the processes and functions described herein. Additionally, the embodiments disclosed herein are not limited to being performed only on the disclosed devices in FIG. 4. It will be appreciated that many various combinations of computing devices or specialized telephonic devices may execute the methods and systems disclosed herein. Examples of such computing devices may include desktop computers, cloud servers, smart phones, personal computers, servers, laptop computers, tablets, blackberries, RFID enabled devices, or any combinations of such devices or similar devices.

In an alternative embodiment, programs run by various electronic, computing, and/or telephonic devices may be internet-based applications, where the program is executed by a web browser or other internet enabled application. Temporary files and/or a web browser may be used on the relay call center computing device 400 or customer premises device 425 in order to execute a program, system, application, etc. in this manner.

The configuration of the customer premises device 425 and the relay call center computing device 400 is merely one physical system on which the embodiments disclosed herein may be executed. Other configurations of the devices shown may exist to practice the disclosed embodiments. Further, configurations of additional or fewer devices than the ones shown in FIG. 4 may exist to practice the disclosed embodiments. Additionally, the devices shown in FIG. 4 may be combined to allow for fewer devices or separated where more than the two devices shown exist in a system.

In other embodiments, specialized hardware may exist on the devices shown in FIG. 4 that is specifically designed to perform or execute the various embodiments disclosed herein. For example, a microphone or speaker may be used at the relay call center computing device 400 or customer premises device 425 to receive and output audio voice signals. The relay call center computing device 400 or customer premises device 425 may also have a display screen that can display text or data. The screen may even be a touch screen, capable of receiving inputs from a call participant or a communication assistant (CA). Either of the relay call center computing device 400 or customer premises device 425 may have other input hardware such as a mouse, keyboard, touchpad, number pad, rotary dialer, or other buttons for functions such as voicemail, directory, caller id, call forwarding, volume, or the like.

Figure 5:
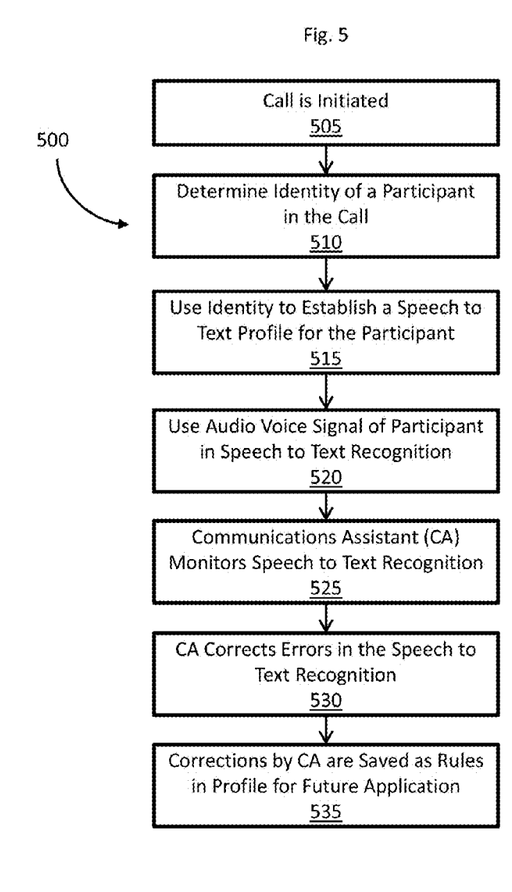
FIG. 5 is a flow diagram illustrating a method of establishing a speech to text profile for use in telephone relay in accordance with an illustrative embodiment.

FIG. 5 is a flow diagram illustrating a method 500 of establishing a speech to text profile for use in telephone relay in accordance with an illustrative embodiment. In alternative embodiments, fewer, additional, and/or different operations may be performed. Also, the use of a flow diagram is not meant to be limiting with respect to the order of operations performed. At an operation 505, a call is initiated. The call may be initiated by a hearing participant or a hard of hearing participant of the call. At an operation 510, the identity of a participant in the call is determined. Generally, the participant whose identity is to be identified is the participant whose audio voice signal is to be transcribed into text. In this embodiment, the determination of identity is done by identifying the phone number of the participant whose audio voice signal will be transcribed.

In other embodiments, other modes of identifying the participant whose voice will be transcribed may be used. For example, a combination of multiple participants' phone numbers may be determined to establish an identity. In another example, the participant may say their name at the beginning of the call and the system could identify a participant through speech recognition of the name. For example, if a participant is queried for their name and responds that their name is "Charles Barkley," the identity established will be for a participant named "Charles Barkley." In another example, the participant's identity may be established through an auditory vocal identity of the participant. For example, rather than storing the identity as a name like "Charles Barkley," the identity will rather be a sound file or portion of a sound file of the participant saying "Charles Barkley." In this embodiment, the words are not identified, but rather characteristics of the sound file are identified. For example, a frequency, amplitude, timbre, etc. of the sound file may be identified. For subsequent calls by the participant, the identity can be identified and matched to the sound characteristic or characteristics identified in the first call participated in by the participant. In another example, an algorithm could be applied the sound file, yielding an auditory watermark that establishes the identity of the participant. In another example, the identity of a participant may be determined by an input into a telephone by the participant. For example, the system may prompt the participant to enter an alphanumeric code through an input interface on a phone, such as a number pad. This alphanumeric code can be established as the identity of the participant. The alphanumeric may be a random code determined by the participant, may be the participants social security number, birthday, phone number, or other identifying and unique number. In another embodiment, the system may be able to identify the gender of an audio voice signal. The gender of the participant may be able to help establish identity. For example, if a husband and wife regularly receive or place calls from the same phone number, the system may be able to establish and maintain speech to text profiles for both the husband and wife even though they call from the same phone number. Similarly, any of the above methods of establishing a participants identity may be used in combination with each other or independently.

At an operation 515, the identity of a participant is used to establish a speech text profile for the participant. For this embodiment, the identity is used to establish a new speech text profile for the participant because a speech text profile for the participant does not already exist. At an operation 520, the participant speaks into his telephone or other device during the call and the audio voice signal of the participant is used in speech to text recognition. At an operation 525, a communication assistant (CA) monitors the speech to text recognition being performed for errors. An error could be when the participant says a word (which is heard by the CA) and the system outputs a different word than the one said by the participant. The CA can then manually correct the word before it is sent to the second participant in the call at an operation 530. The correction is then saved as a rule in the speech to text profile at an operation 535 so that if the speech to text program hears the wrong word again it will automatically output the correct word based on the rule. In an alternative embodiment, the correction is not made by the CA before the incorrect word is output to the second participant in the call. However, the correction may still be saved as a rule for future application to be used when transcribing future audio voice signals for the participant.

Figure 6:
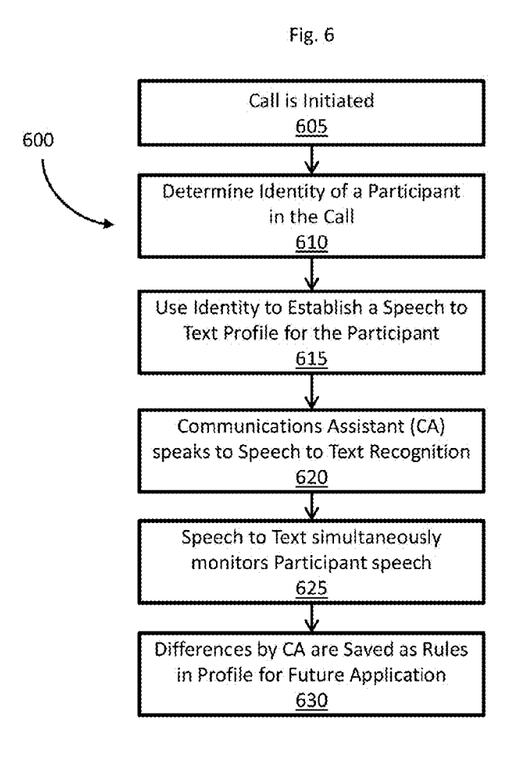
FIG. 6 is a flow diagram illustrating another method of establishing a speech to text profile for use in telephone relay in accordance with an illustrative embodiment.

FIG. 6 is a flow diagram illustrating another method 600 of establishing a speech to text profile for use in telephone relay in accordance with an illustrative embodiment. In alternative embodiments, fewer, additional, and/or different operations may be performed. Also, the use of a flow diagram is not meant to be limiting with respect to the order of operations performed. At an operation 605, a call is initiated. At an operation 610, an identity of a participant in the call is identified. This identification may occur in any manner similar to those discussed above with respect to operation 510 in FIG. 5. At an operation 615, the identity established is used to establish a speech to text profile for the participant. In this embodiment, a speech to text profile had not previously been established for the participant. At an operation 620, a communication assistant (CA) speaks to the speech to text recognition program. In this embodiment, the profile for the CA has already been trained. That is, the CA's speech can be adequately transcribed into text by the speech to text program, either because the CA has been taught how to speak to the software properly or because the CA has a speech to text profile that has already been adequately trained. In this embodiment, the CA is hearing the audio voice signal from the participant and speaking the words into the speech to text system. In this manner, the speech to text system can determine an accurate baseline for transcribing the audio voice signal from the participant. In this embodiment, the output text to the second participant is the transcription made based on the words of the CA.

In an operation 625, the speech to text system simultaneously transcribes the audio voice signal directly from the audio voice signal rather than through the CA. In an operation 630, the speech to text system compares the transcription made based on the voice of the CA against the transcription made based directly on the audio voice signal and saves a rule to the speech to text profile where there are differences in the two transcriptions. Where the two transcriptions do not differ, no additional actions are necessary and no rule is saved. Whenever the two transcriptions do differ, the transcription based on the CA is treated as the correct transcription. Therefore, the rule saved is that every time the speech to text system hears the particular "wrong" word from the audio voice signal it instead transcribes the correct word as taught to the system by the transcription derived from the CA. The rules saved based on the comparison of the two transcriptions can therefore be saved for future application after the speech to text profile has been adequately trained and a CA is no longer needed to repeat the words the CA hears from the audio voice signal.

Figure 7:
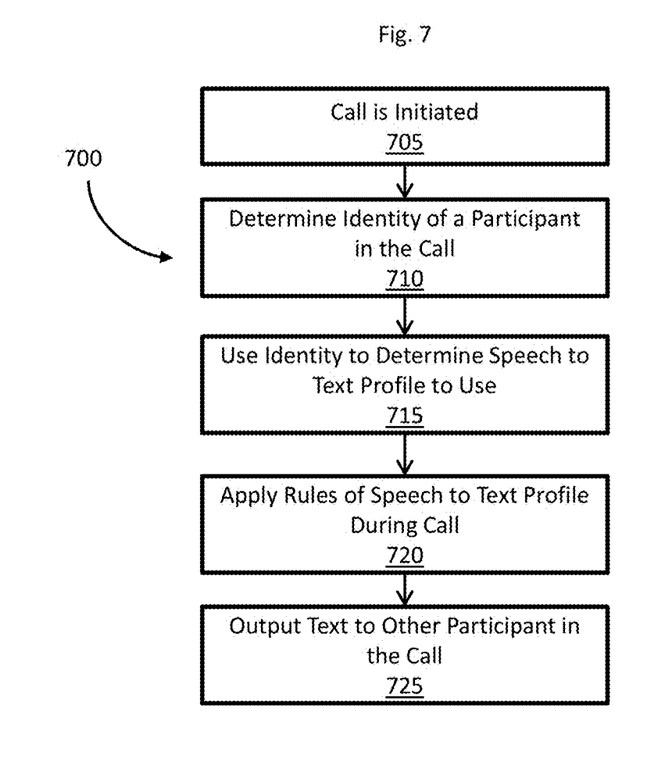
FIG. 7 is a flow diagram illustrating a method of using a speech to text profile in a telephone relay setting in accordance with an illustrative embodiment.

FIG. 7 is a flow diagram illustrating a method 700 of using a speech to text profile in a telephone relay setting in accordance with an illustrative embodiment. In alternative embodiments, fewer, additional, and/or different operations may be performed. Also, the use of a flow diagram is not meant to be limiting with respect to the order of operations performed. At an operation 705, a call is initiated. At an operation 710, an identity of a participant in the call is identified. This identification may occur in any manner similar to those discussed above with respect to operation 510 in FIG. 5. At an operation 715, the identity is used to determine a speech to text profile to use for transcribing the audio voice signal of the participant into text. In this embodiment, a speech to text profile has already been created and fully trained. In an alternative embodiment, the speech to text profile has already been created and may be used even if it has not been fully trained. At an operation 720, the rules saved in the speech to text profile are applied, if applicable, to the transcribing of the audio voice signal into text. At an operation 725, the output text from the speech to text system is output to a second participant in the call.

Figure 8:
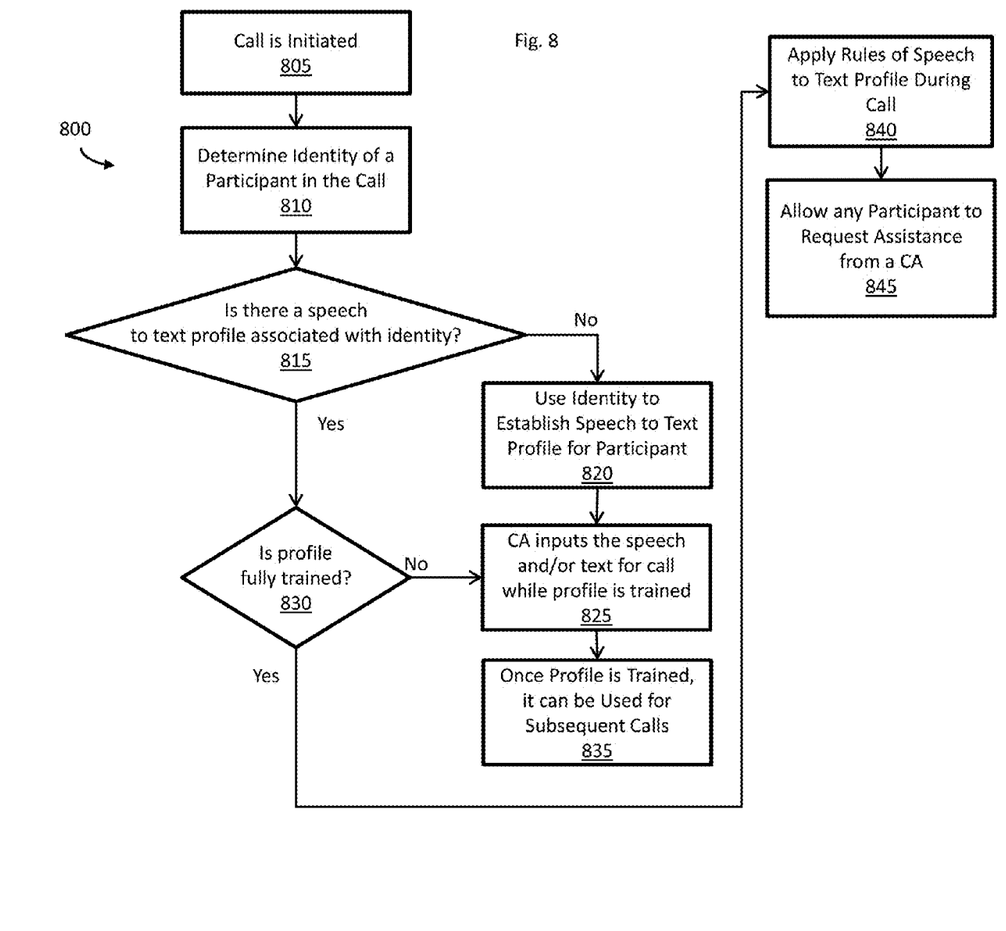
FIG. 8 is a flow diagram illustrating a method of determining whether to use a speech to text profile in a telephone relay setting in accordance with an illustrative embodiment.

FIG. 8 is a flow diagram illustrating a method 800 of determining whether to use a speech to text profile in a telephone relay setting in accordance with an illustrative embodiment. In alternative embodiments, fewer, additional, and/or different operations may be performed. Also, the use of a flow diagram is not meant to be limiting with respect to the order of operations performed. At an operation 805, a call is initiated. At an operation 810, an identity of a participant in the call is identified. This identification may occur in any manner similar to those discussed above with respect to operation 510 in FIG. 5. At an operation 815, the system determines whether a speech to text profile exists that is associated with the identity determined at operation 810. If a speech to text profile does not exist, then the identity id used to establish a speech to text profile for the participant at an operation 820. Establishing the speech to text profile may be similar to operations 515 and 615 as described above with respect to FIGS. 5 and 6. If a speech to text profile does exist, the system determines if the existing speech to text profile is fully trained at an operation 830. If the existing speech to text profile is determined to not be fully trained at operation 830, and if a speech to text profile has just been established at operation 820, the communications assistant (CA) hears the audio voice signal and inputs the text via a keyboard or the CA's voice at an operation 825. The input of the CA at operation 825 is used to send to the second participant of the call. Once the profile is adequately trained, it can be used for subsequent calls involving the participant as indicated at operation 835.

At operation 830, if the speech to text profile is determined to be fully trained, the rules in the speech to text profile are applied to the output of the system while it is transcribing the audio voice signal received from the participant device at an operation 840. Several criteria may be used to determine if a speech to text profile is fully trained. In an illustrative embodiment, a speech to text profile is fully trained when it has been trained for a minimum threshold of cumulative call time. That is, a particular speech to text profile may be trained over the course of one or more phone calls, and the speech to text profile will be considered trained after the cumulative phone call time of the one or more phone calls reaches a threshold time. Examples of a minimum threshold of cumulative phone call time for training may be 10, 20, 30, 60, 90, or 120 minutes to obtain a level of accuracy suitable for a commercial telephone relay service.

In another embodiment, a speech to text profile may be considered fully trained when the profile contains a predetermined minimum threshold of rules. That is, when a predetermined number of corrections to the speech to text profile have been identified and saved in the profile, the profile is considered fully trained. For example, a profile may be considered fully trained when the profile contains 5, 10, 50, 100, or 500 rules.

In another embodiment, a speech to text profile may be considered fully trained when a number of calls involving the participant meets a predetermined minimum threshold of rules. That is, after a predetermined number of calls have occurred involving the participant and during those the speech to text profile has been trained, the profile is considered fully trained. For example, a profile may be considered fully trained when the participant has been involved in 3, 5, 10, 20, or 50 calls.

In another embodiment, a speech to text profile may be considered fully trained when the participant has spoken a minimum threshold of unique or total words. That is, when the system has heard a minimum threshold vocabulary from the participant, the profile is considered fully trained. For example, a profile may be considered fully trained when the speech to text system has heard 500; 1,000; 2,000; 5,000; 10,000; 50,000; 100,000, or 200,000 total words from the participant. In another example, a profile may be considered fully trained when the speech to text system has heard 500; 1,000; 2,000; 5,000, 10,000, 20,000, 40,000, or 80,000 unique words from the participant. The totals tracked for these embodiments may be cumulative over a series of calls. In a specific embodiment, a profile may be considered to be fully trained when a particular known threshold of vocabulary is met. For example, the vocabulary (or unique words known) of an average college graduate is 75,000 words, while the vocabulary of the average high school graduate may be 45,000. Accordingly, a profile may be considered fully trained when it hears either 45,000 or 75,000 unique words. In another embodiment, the profile may be considered fully trained when it hears a certain percentage of a known threshold. For example, if the high school threshold is utilized, the profile may be considered fully trained after the system has heard 33% of the high school vocabulary is heard, or 15,000 words. Another threshold that may be utilized is a minimum conversation threshold. For example, the average conversation may utilize less than 6,000 unique words. Accordingly, a profile may be considered completely trained when the system has heard 6,000 unique or total words. In other embodiments, multiples or percentages of the 6,000 word threshold may be used.

At an operation 845, any participant is able to request assistance from a communications assistant (CA) during the call. A participant may do so if the speech to text is not accurate, or if the hearing participant does not like hearing an automated voice say the words inputted by a speaking-impaired participant. A CA may be requested in various ways. For example, special telephones may be equipped with a button that is particularly designated to request a CA when a participant's audio voice signal is being transcribed. In one embodiment, the button itself or a display near the button may indicated that an audio voice signal for the call is being automatically transcribed. In other words, the button or display indicates that requesting a CA is available when an audio voice signal is being automatically transcribed. Any participant in a call is able to request a CA during a call. In another embodiment, a participant may request a CA by verbally asking for one. The speech to text technology would then recognize the verbal request and page a CA to assist with the call. In another embodiment, the participant may enter a code on a phone to indicate a request for a CA. For example, a participant may press "22#" on their telephone number pad to request a CA. In this embodiment, the participants may be notified when the call starts that a CA can be requested by pressing "22#" on their telephone number pads.

In an additional illustrative embodiment, the relay call center system tracks the frequency of calls received or placed by a particular participant. In this embodiment, only participants that have a high (as compared to other users or that meet a minimum predetermined threshold) number of calls are established speech to text profiles. Advantageously, this preserves space in computer memory from having to create, maintain, etc. profiles for every participant in every call. Additionally, this focuses the resources of the speech to text system on the participants that proportionally use the communications assistants (CA) more often, thus saving costs for a call center by freeing up CA staff for longer periods of time.

In alternative embodiments, some of the systems and methods disclosed herein may be applied outside of the relay for the hard of hearing context. For example, systems and methods disclosed herein may be used in any context where calls are placed, and particularly where there are repeat callers.

In one illustrative embodiment, a different context where the disclosed systems and methods may be applied are in a customer service call center. For example, a business travel center or airline that interfaces with the same customers on a regular basis may incorporate the systems and methods disclosed herein. In this example, the call center system may recognize the caller's identification (caller ID telephone number) and link that phone number to a speech to text training and account. In another example, a caller may enter a frequent flyer number, say their name, or identify themselves in some other way that they system can link to an account. In this example, the call center system could be trained using the systems and methods disclosed herein. In this way, when a repeat caller uses the system, the system may more easily understand the caller. This may be particularly useful for customer service centers that utilize automated answering and customer assistance systems. In other words, when a customer calls in and interfaces with an automated customer service system using voice commands, the system may function more efficiently using the speech to text methods and systems disclosed herein.

Other examples where the methods and systems disclosed herein may be utilized includes technical support centers (such as computer, internet, television, etc.), government hotlines, banking customer service systems, ticket sales centers (such as those that sell tickets for sports events, concerts, etc.), car rental call centers, telemarketing or automated calling centers, reservation centers (such as hotels, etc.), credit/debit card assistance call centers, service scheduling centers (such as cleaning services, cable/satellite/internet installers, plumbers, carpenters, construction/remodelers, appliance installers, etc.), and any other industry that utilizes call centers.

Figure 9:
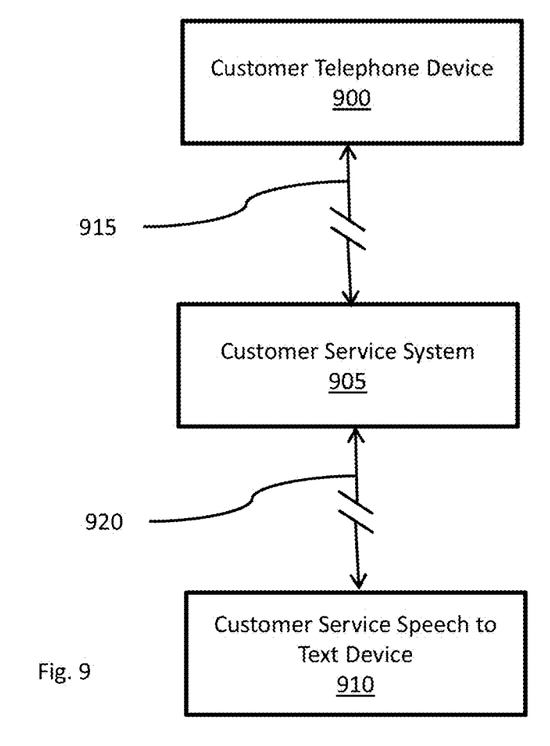
FIG. 9 is a block diagram illustrating electronic and telephonic devices that may be used in a customer service system in accordance with an illustrative embodiment.

FIG. 9 is a block diagram illustrating electronic and telephonic devices that may be used in a customer service system in accordance with an illustrative embodiment. In alternative embodiments, fewer, additional, and/or different components may be included in the system. In FIG. 9, a customer telephone device 900 is shown. The customer telephone device may be a standard telephone that operates over a PSTN or a telephone that operates over internet protocol (IP). In other alternative embodiments, The customer telephone device 900 may be a mobile phone that operates over an a mobile telephone network. The customer telephone device 900 could also be a computing device or smart phone that is capable of performing telephonic functions utilizing voice over internet protocol (VoIP) technologies. In other embodiments, the customer telephone device 900 may also be a special telephone as disclosed herein.

The customer telephone device 900 is capable of receiving input from a customer that cause the telephone device 900 to place or initiate a call to a customer service system 905 over a connection 915. The customer service system 905 could be any kind of customer service center as disclosed herein, such as an information technology help desk or an airline travel center. The connection 915 indicates a network or series of networks over which a call may be routed and placed. In alternative embodiments, the customer service system 905 may further route and connect a call to a particular operator or facet of the customer service system 905 at different times throughout a call.

In this embodiment, when the customer telephone device 900 is connected to the customer service system 905 over the connection 915, it facilitates a conversation between a caller and the customer service system 905. An automated customer service system 905 may interact with the caller. For example, an automated customer service system 905 may be able to hear audio voice signals transmitted from the customer telephone device 900 and perform a speech to text function on the speech as disclosed herein. In another embodiment, a live operator at the customer service system 905 may also be involved in a call. For example, a live operator may assist in calls with a caller that has a particular speech to text profile that has not yet been fully trained as disclosed herein. In another embodiment, the caller may start out with an automated system and be transferred at some point during the call to a live operator. A caller could also be transferred from a live operator to an automated system at some point during a call.

The customer service system 905 may also be connected to a customer service speech to text device 910 through a connection 920. The connection 920 indicates an electrical data connection between the customer service center 905 and the customer service speech to text device 910. The customer service speech to text device 910 stores data relating to individual speech text profiles related to specific callers as disclosed herein. The customer service speech to text device 910 also performs the speech to text function during a call. As such, the speech to text device 910 also includes information related to global speech to text rules. In other words, the default rules of how speech is transcribed to text notwithstanding rules related to a particular speech to text profile. The customer service system 905 and the customer service speech to text device 910 communicate with each other so that the audio voice signal from the customer telephone device 900 can be sent to the customer service speech to text device 910, and text relating to the speech within the audio voice signal can be sent back to the customer service system 905.

Although the customer service system 905 and the customer service speech to text device 910 are shown as separate elements in FIG. 9, the two elements may, in some embodiments, be integrated into a single computing system. That is, when a caller initiates a call with a customer service center, there may only be one computing device that intakes and routes calls within the customer service center, administrates an automated customer service system, and performs some or all of the speech to text methods as disclosed herein.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, at a processor of a computing device, an audio voice signal of a first call participant during a first call, wherein the first call is a communication across a communication network;
   determining, by the processor of the computing device, an identity of the first call participant;
   determining, by the processor of the computing device, a speech to text profile associated with the identity of the first call participant,
   wherein the speech to text profile comprises a plurality of rules, and
   further wherein each of the plurality of rules is a rule for transcribing a word in the audio voice signal into text; and
   wherein the speech to text profile is adequately trained when a number of the plurality of rules reaches a predetermined threshold; and
   generating, by the processor of the computing device, a text output, wherein the text output is a transcribed version of a plurality of words identified in the audio voice signal of the first call participant, and further wherein at least one of the plurality of words identified is identified using at least one rule of the plurality of rules; and
   wherein the speech to text profile is used to generate a text output after the speech to text profile has been adequately trained.

2. The method of claim 1, further comprising establishing, by the processor of the computing device, the speech to text profile for the first call participant, wherein a relationship is established between the speech to text profile and the identity of the first call participant.

3. The method of claim 2, wherein the establishing the speech to text profile comprises:
   receiving, by the processor of the computing device, a unique identifier, wherein the unique identifier is unique to the first call participant; and
   establishing, by the processor of the computing device, the speech to text profile by associating the speech to text profile with the unique identifier.

4. The method of claim 3, wherein the establishing the speech to text profile further comprises establishing the at least one rule for transcribing a word into text, wherein the at least one rule is established by:
   receiving, by the processor of the computing device, an input indicating what the word in the audio voice signal is; and
   generating, by the processor of the computing device, the text output using the input.

5. The method of claim 4, wherein the input is a communication assistant (CA) audio voice signal, and further wherein the processor of the computing device can accurately recognize a CA word in the CA audio voice signal, and wherein the CA word indicates the word in the audio voice signal.

6. The method of claim 4, wherein the input is a sequence of text inputs received by the processor of the computing device from a user interface, wherein the sequence of text inputs comprises an indication of letters that form the word in the audio voice signal.

7. The method of claim 1, wherein the plurality of rules is established over more than one call involving the first call participant.

8. The method of claim 1, wherein the speech to text profile is adequately trained when a cumulative call time over the more than one call involving the first call participant meets or exceeds a predetermined call time threshold.

9. The method of claim 1, wherein the speech to text profile is adequately trained when a number of calls involving the first call participant reaches a predetermined threshold.

10. The method of claim 1, wherein determining the identity of the first call participant comprises receiving, by the processor of the computing device, a unique identifier, wherein the unique identifier is used to determine the identity of the first call participant.

11. The method of claim 10, wherein the unique identifier comprises at least one of a phone number of the first call participant, an auditory vocal identity of the first call participant, an auditory voiced name of the first call participant, an alphanumeric sequence received by the processor of the computing device from a user interface, and a phone number of a second call participant of the first call.

12. The method of claim 1, further comprising sending, by the processor of the computing device, the text output to a visual display.

13. The method of claim 12, wherein the visual display is viewable by a second call participant of the first call.

14. The method of claim 1, further comprising receiving, by the processor of the computing device, a request for communication assistant (CA) assistance from one of a second call participant of the first call and the first call participant, wherein the request indicates that the first or second call participant desires a CA to input the audio voice signal or generate the text output.

15. The method of claim 14, wherein the request for CA assistance comprises an input received by the processor of the computing device from a user interface.

16. A system comprising:
a memory; and
a processor coupled to the memory, wherein the processor is configured to:
receive an audio voice signal of a first call participant during a first call,
wherein the first call is a communication across a communication network; determine an identity of the first call participant;
determine a speech to text profile stored in the memory that is associated with the identity of the first call participant,
wherein the speech to text profile comprises a plurality of rules, and
further wherein each of the plurality of rules is a rule for transcribing a word in the audio voice signal into text; and
wherein the speech to text profile is adequately trained when a number of the plurality of rules reaches a predetermined threshold; and
generate a text output, wherein the text output is a transcribed version of a plurality of words identified in the audio voice signal of the first call participant, and further wherein at least one of the plurality of words identified is identified using at least one rule of the plurality of rules; and
wherein the speech to text profile is used to generate a text output after the speech to text profile has been adequately trained.

17. A non-transitory computer readable medium having instructions stored thereon for execution by a processor, the instructions comprising:
instructions to receive, by the processor, an audio voice signal of a first call participant during a first call, wherein the first call is a communication across a communication network;
instructions to determine, by the processor, an identity of the first call participant;
instructions to determine, by the processor, a speech to text profile associated with the identity of the first call participant, wherein the speech to text profile comprises a plurality of rules,
and further wherein each of the plurality of rules is a rule for transcribing a word in the audio voice signal into text; and
wherein the speech to text profile is adequately trained when a number of the plurality of rules reaches a predetermined threshold; and
instructions to generate, by the processor, a text output, wherein the text output is a transcribed version of a plurality of words identified in the audio voice signal of the first call participant, and further wherein at least one of the plurality of words identified is identified using at least one rule of the plurality of rules; and
wherein the speech to text profile is used to generate a text output after the speech to text profile has been adequately trained.

\* \* \* \* \*